Aug. 27, 1935.  H. SCHMIDT ET AL  2,012,893

FREEWHEEL HUB WITH BRAKE DEVICE

Filed Oct. 24, 1933

Inventors

Hermann Schmidt
and
Hans Schmidt per
Dean Fairbank Hirsch & Foster
their Attorneys Patented Aug. 27, 1935

2,012,893

UNITED STATES PATENT OFFICE 2,012,893

FREE-WHEEL HUB WITH BRAKE DEVICE

Hermann Schmidt, Suhl, and Hans Schmidt, Jena, Germany

Application October 24, 1933, Serial No. 694,946
In Germany October 26, 1932

9 Claims. (Cl. 192—6)

The invention relates to a free wheel hub with coaster brake particularly for bicycles and like vehicles. In hubs of this type the brake is applied by back-pedalling whereby the driver in its backward rotation operates intermediate parts which apply the brake member to the inner face of the hub shell.

In such appliances the brake automatically at once returns to its inoperative position owing to its elasticity, so that the cyclist is compelled to continuously press the pedals backwards thereby causing a substantial fatigue of the cyclist on long slopes.

The object of the invention is to so construct the free wheel hub with coaster brake that the brake is maintained operative, even when back-pedalling ceases so that the braking effect continues for any selective time.

This object is attained by the provision of a locking device which will, after backward rotation of the driving member, immobilize the said member or a part engaged with it in its braked position, thus also holding the brake operative. Then the cyclist may let his feet loosely rest and balance on the two pedals or take them off therefrom.

The engagement of the locking device may be made at will or automatically.

In the drawing, which forms a part of this specification, two embodiments of the invention are illustrated by way of examples.

Like numerals denote like parts in all figures of the drawing.

Figure 1:
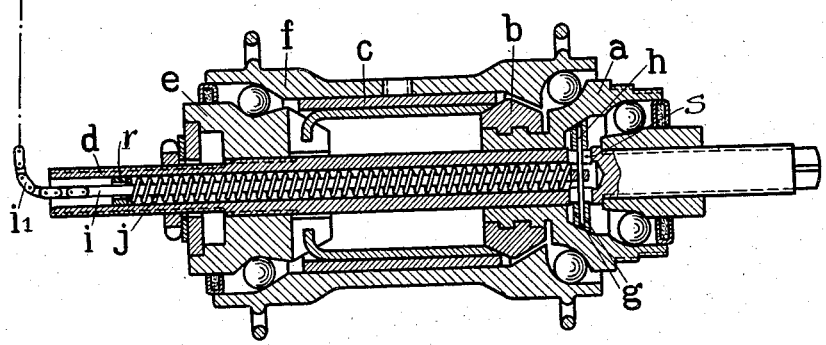
Fig. 1 is a sectional elevation on the axis of a free wheel hub with coaster brake provided with the novel locking device.

Referring to Fig. 1, the free-wheel hub with coaster brake comprises an axle $d$ which is in the usual manner immovably mounted in a cycle frame, a driving member $a$ rotatably supported on the axle by means of a ball bearing, a cone member $e$ non-rotatably fixed upon the axle, and a hub shell or casing $f$ rotatably mounted on the cone member $e$ and the driver $a$ respectively, as for example by ball bearings. On a projection of the driver $a$ screw threads of high pitch are provided threaded onto a coupling sleeve $b$ having female threads so that said sleeve is screwable to the right as shown in Fig. 1 into engagement with the hub shell $f$ when the driver is rotated forwards through the pedals (not shown) or to the left on backward rotation of the driver. An expansible brake member $c$ composed of two interengaged sleeves is supported at its ends upon the conical inner end of the member $e$ and upon an adjacent cone face of the coupling member $b$ respectively. The said cones are the expanding means for the brake $c$ which is applied to the inner face of the hub shell when the coupling member $b$ is forced towards the cone member $e$.

The appliance for locking the driver $a$ in its brake actuating position is composed of a cone $g$ shiftably mounted in a conical recess of the driver and on the axle $d$, and encircling an axial slot $s$ in the axle. A flat pin $h$ passing through a radial bore of the cone $g$, the slotted axle $d$ and a rod $i$ located in a central bore of the axle holds the cone $g$ against rotation. A helical spring $j$ surrounding the rod $i$ bears at one end against an abutment ring $r$ fixed in the axle and tends at its other end to urge the pin $h$ to the right as shown in Fig. 1. To the outer end of the rod $i$ by means of a flexible element, such as a chain $i_1$, a Bowden cable with an adapter of the well known construction is joined. By the operation of this Bowden device the cyclist may push the rod $i$ to the left thereby shifting the locking cone $g$ at the same time and engaging it with the wall of the conical recess of the driver.

The locking device operates as follows. When the cyclist has by back-pedalling applied the brake to the hub shell he may immobilize the driver $a$ and consequently the brake in their respective positions by operating the Bowden device in order to displace the rod $i$ and the cone $g$ to the left until the coupling engagement between the cone $g$ and the female cone of the driver $a$ is obtained, as seen from Fig. 1. Then the braking effect is maintained independently of back-pressure on the pedals. Releasing of the Bowden device causes the spring $j$ to automatically disconnect the locking device, so that the driver $a$ can again be rotated.

Figure 2:
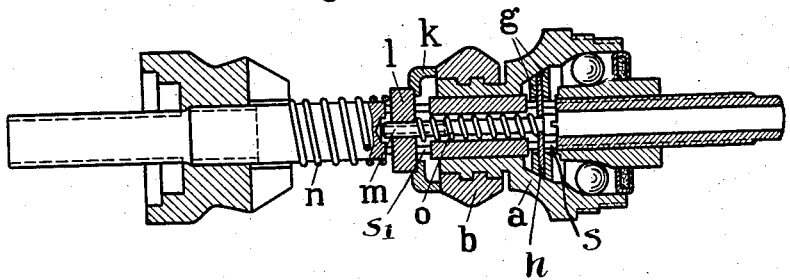
Fig. 2 is a similar sectional view of a modification of the appliance in which adjustment of the locking device automatically takes place, the brake sleeve and the hub casing not being represented.
Figure 3:
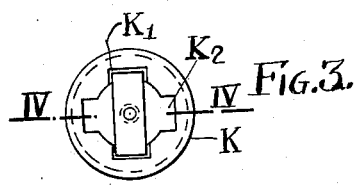
Fig. 3 shows a detail of Fig. 2 in front elevation.
Figure 4:
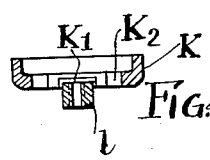
Fig. 4 is a cross-section on the line IV—IV of Fig. 3.

Fig. 2 represents a modification of the locking device in which the displacement of the locking cone $g$ is automatically accomplished both on pedalling backwards and forwards for arresting and releasing the driver $a$ respectively. The cone $g$, the pin $h$ and the slot $s$ are substantially the same as hereabove described. In a second similar slot $s_1$ a block $l$ is axially displaceable in unison with the pin $h$ to which it is connected by a screw $m$ passing through a bore of the pin $h$ and engaging a female screw thread of the block $l$. A helical spring $o$ holds the pin and block apart. To the left side of the coupling sleeve $b$ bears a dish-shaped bush or ring $k$ interconnected with the block $l$, the ends of which, as best seen from Fig. 4, engage recesses $k_1$ of the member $k$. Other recesses $k_2$ permit the bush $k$ to be disconnected from the block $l$ by a relative turning through an angle of 90°. A spring $n$ tends to displace the entire locking device to the right. By turning the screw $m$ the distance between the pin $h$ and block $l$ may be varied in accordance with requirements.

When the driver $a$ is rotated backwards the coupling sleeve $b$ is displaced to the left by the screw threads interconnecting these two parts. The sleeve $b$ is prevented from rotating with the driver owing to its frictional contact with the non-rotatable ring $k$. By this displacement expanding of the brake and axial shifting of the parts $k, l, m, o, h$ and $g$ are accomplished until the cone $g$ contacts the driver $a$. During this action the spring $n$ is compressed. Thus not only the driver but also the coupling sleeve $b$ has been frictionally immobilized. On subsequent forward rotation of the driver for the purpose of disconnecting the locking engagement a certain increased amount of power is required since sliding of the driver on the cone is to be caused. However, as the forward rotation of the driver will at the same time move the sleeve $b$ to the right along the screw threads of high pitch the spring $n$ will at the beginning of back pedalling be allowed to shift the cone $g$ at once to the right, thereby uncoupling the driver, so that the increase of effort is required only for a minimum of time. The friction in the several parts arranged between the driver and brake will assist the locking effect so that the engagement of the locking device is done rather smoothly.

What we claim as new, and desire to secure by Letters Patent, is—

1. In a free-wheel hub with brake device, a driver, brake actuating means, transmitting means, clamping or immobilizing means comprising a slidable non-rotatable member, a pin passing through a slot in this member and in the hub axle respectively, a second pin passing through another slot in the said hub axle, a longitudinal bore in the said axle, a member housed in this bore and connecting the first and the second pins, curve surfaces adapted to displace the second pin when back-pedalling takes place so as to cause the said second pin to operate the said clamping or immobilizing means.

2. In a free-wheel hub with brake device, a driver having a female cone recess, clamping means adapted to immobilize the said driver by being pulled into the female cone recess thereof, a brake actuating double cone, means adapted to displace the said double cone into the braking position when the said driver is back-pedalled, a block adapted to frictionally couple with the said double cone, a pull rod connecting the said block to the said clamping means, and means caused by the said displacement of the double cone to pull the said clamping means into the said female cone of the driver by means of the said block and pull rod.

3. In a free-wheel hub with back-pedalling brake, the combination with a stationary wheel axle, of a driver rotatably mounted thereon, brake-applying and releasing means operated by rotating the driver backwards or forwards respectively, the said driver and brake-applying and releasing means being interengaged, and interconnected coupling means adapted to immobilize automatically the driver and the brake-actuating and releasing means respectively, one part of said coupling means being carried by said brake-actuating and releasing means, while the other part is non-revolubly but shiftably mounted on the said wheel axle.

4. In combination, a wheel hub for a bicycle, a driver coaxial with said hub, means automatically responsive to the forward rotation of said driver for transmitting driving power from said driver to said hub, means automatically responsive to a back pedalling action on said driver for braking said hub, and means for locking said driver in back pedalled or braking position, whereby in said latter position the hub will be braked without a continued application of back pedalling pressure.

5. In combination, a wheel hub for a bicycle, a driver, brake applying and brake releasing means operated automatically for applying a brake to said hub upon forward rotation of said driver and for releasing said brake upon back pedalling action on said driver, a locking member, and means for moving said locking member into locking engagement with said driver, whereby said driver, in back pedalled or braking position, may be immobilized irrespective of back pedalling pressure on said driver.

6. In combination, a wheel axle for a bicycle, a wheel hub encircling said axle, a driver for said hub concentric with and rotatable about said axle, brake applying and brake releasing means for said hub and operated by said driver, a locking member mounted for movement along said axle, and means for moving said locking member lengthwise of said axle into or out of locking position with respect to said driver, whereby said driver may be immobilized without a continued application of manual braking pressure.

7. In combination, a wheel hub for a bicycle, a driver coaxial with said hub, means automatically responsive to the forward rotation of said driver for transmitting driving power from said driver to said hub, means automatically responsive to a back pedalling action on said driver for braking said hub, and means automatically responsive to the back pedalling action on said driver for locking said driver in back pedalled or braking position, whereby in said latter position the hub will be braked without a continued application of back pedalling pressure.

8. In combination a wheel axis for a bicycle, a wheel hub supported on said axle, a driver rotatable on said axle, means for transmitting power from said driver to said hub upon forward rotation of said driver, means responsive to back pedalling action on said driver for braking said hub, a locking member mounted on said axle for lengthwise movement therealong and having a surface adapted to coact with part of the surface of said driver for frictional braking engagement, and means for moving said locking member into position to effect interengagement of said surfaces when said driver is in back pedalled or braking position, whereby said driver is held immobilized in said position without a continued application of back pedalling pressure.

9. In combination, a wheel hub, a driver for said hub, having a conical recess, brake applying and releasing means for said hub automatically operated by said driver, a locking member mounted for axial movement with respect to said driver and having a conical surface corresponding to the conical surface of said recess, and means for moving said locking member to effect interengagement of said conical surfaces to immobilize said driver when said driver is in braking position.

HERMANN SCHMIDT.
HANS SCHMIDT.